(12) United States Patent
Subramanian et al.

(10) Patent No.: US 10,566,588 B2
(45) Date of Patent: Feb. 18, 2020

(54) BATTERY CELL SUPPORT ASSEMBLY

(71) Applicant: Ford Global Technologies, LLC, Dearborn, MI (US)

(72) Inventors: Rajaram Subramanian, Ann Arbor, MI (US); Bhaskara Boddakayala, Troy, MI (US); Saravanan Paramasivam, South Lyon, MI (US); Steve Droste, Ypsilanti, MI (US); Enrique Rivera, Taylor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 404 days.

(21) Appl. No.: 15/271,314

(22) Filed: Sep. 21, 2016

(65) Prior Publication Data
US 2018/0083239 A1 Mar. 22, 2018

(51) Int. Cl.
| | |
|---|---|
| H01M 2/10 | (2006.01) |
| H01M 10/04 | (2006.01) |
| B29C 44/12 | (2006.01) |
| B29C 65/70 | (2006.01) |
| B29C 70/88 | (2006.01) |

(Continued)

(52) U.S. Cl.
CPC ....... *H01M 2/1077* (2013.01); *B29C 44/1228* (2013.01); *B29C 65/70* (2013.01); *B29C 70/88* (2013.01); *H01M 10/0468* (2013.01); *H01M 10/0481* (2013.01); *B29K 2075/00* (2013.01); *B29K 2077/00* (2013.01); *B29K 2105/04* (2013.01); *B29K 2995/007* (2013.01); *B29L 2031/3468* (2013.01); *H01M 2220/20* (2013.01)

(58) Field of Classification Search
CPC .......................... H01M 2/1077; H01M 10/647
See application file for complete search history.

(56) References Cited

U.S. PATENT DOCUMENTS

| | | | | |
|---|---|---|---|---|
| 2003/0047364 | A1* | 3/2003 | Lipman | B60R 16/04 180/68.1 |
| 2007/0259258 | A1* | 11/2007 | Buck | B29C 44/1233 429/120 |

(Continued)

FOREIGN PATENT DOCUMENTS

WO 2016016017 2/2016

OTHER PUBLICATIONS

Gauchel, Dr.-Ing Wolfgang, and Dipl-Ing. Sebastian Haag, Servopneumatic Clamping System for the Assembly of Battery Cells in the Area of Electromobility, Group 9—Pneumatics | Paper 9-3, 10th International Fluid Power Conference, Dresden, Germany 2016, p. 137-148.

*Primary Examiner* — Olatunji A Godo
(74) *Attorney, Agent, or Firm* — David Kelley; Carlson, Gaskey & Olds, P.C.

(57) ABSTRACT

An exemplary support assembly for a battery array includes, among other things, a frame and an insert secured to the frame. The insert is configured to hold at least one battery cell within the frame. The frame is made of a first material and the insert is made of a second material that is softer than the first material. An exemplary method of securing a battery cell within a traction battery pack of an electrified vehicle includes, among other things, compressing an insert against the at least one battery cell. The insert is secured to a frame made of a first material. The insert is made of a second material that is softer than the first material.

19 Claims, 5 Drawing Sheets

(51) Int. Cl.
 *B29K 75/00* (2006.01)
 *B29K 77/00* (2006.01)
 *B29K 105/04* (2006.01)
 *B29L 31/34* (2006.01)

(56) References Cited

U.S. PATENT DOCUMENTS

| | | |
|---|---|---|
| 2013/0280596 A1 | 10/2013 | Lee et al. |
| 2013/0323572 A1 | 12/2013 | Corson |
| 2015/0037662 A1 | 2/2015 | Pinon et al. |
| 2015/0180095 A1 | 6/2015 | Chen et al. |
| 2015/0214570 A1* | 7/2015 | Deponte ........... H01M 10/0481 429/99 |

* cited by examiner

BATTERY CELL SUPPORT ASSEMBLY

TECHNICAL FIELD

This disclosure relates generally to a support assembly that holds battery cells within a battery pack of an electrified vehicle and, more particularly, to a support assembly incorporating a relatively soft insert.

BACKGROUND

Electrified vehicles differ from conventional motor vehicles because electrified vehicles are selectively driven using one or more electric machines powered by a battery pack. The electric machines can drive the electrified vehicles instead of, or in addition to, an internal combustion engine. Example electrified vehicles include hybrid electric vehicles (HEVs), plug-in hybrid electric vehicles (PHEVs), fuel cell vehicles (FCVs), and battery electric vehicles (BEVs).

A battery pack of an electrified vehicle typically includes one or more battery arrays. Each of the battery arrays can include a plurality of battery cells along an axis. Support assemblies hold the battery cells within the battery arrays. Each of the support assemblies can include a relatively rigid frame disposed about an outer perimeter of one or more of the battery cells.

SUMMARY

A support assembly for a battery array according to an exemplary aspect of the present disclosure includes, among other things, a frame, and an insert secured to the frame. The insert is configured to hold a battery cell within the frame. The frame is made of a first material and the insert made of a second material that is softer than the first material.

In a further non-limiting embodiment of the foregoing support assembly, the frame includes an aperture configured to receive the battery cell. The insert is disposed about a perimeter of the aperture.

A further non-limiting embodiment of any of the foregoing support assemblies includes the battery cell, and the battery cell is press-fit into the aperture such that the battery cell compresses the insert.

A further non-limiting embodiment of any of the foregoing support assemblies includes the battery cell, and the battery cell is a pouch cell.

A further non-limiting embodiment of any of the foregoing support assemblies includes a first battery cell having a portion positioned within the aperture, and a second battery cell having a portion positioned within the aperture.

In a further non-limiting embodiment of any of the foregoing support assemblies, the aperture has a rectangular perimeter, and the insert includes a portion disposed on a first lateral side, an opposing, second lateral side, a top side, and a bottom side of the rectangular perimeter.

In a further non-limiting embodiment of any of the foregoing support assemblies, the perimeter includes a plurality of corners without the insert to provide relief areas for the battery cell.

In a further non-limiting embodiment of any of the foregoing support assemblies, the frame is disposed about an axis, and the insert is configured face toward the axis such that the insert directly contacts a surface of the battery cell facing away from the axis.

In a further non-limiting embodiment of any of the foregoing support assemblies, the first material has a higher durometer than the second material.

In a further non-limiting embodiment of any of the foregoing support assemblies, the first material comprises nylon, and the second material is a polyurethane foam or any other suitable foam material.

In a further non-limiting embodiment of any of the foregoing support assemblies, the frame and insert are portions of a traction battery pack of an electrified vehicle.

An electrified vehicle battery array according to an exemplary aspect of the present disclosure includes, among other things, a plurality of second support assemblies disposed along an axis with first support assembly. The first frame and second support assemblies are compressed along the axis.

A method of securing a battery cell within a traction battery pack of an electrified vehicle according to an exemplary aspect of the present disclosure includes, among other things, compressing an insert against a battery cell. The insert is secured to a frame that is made of a first material. The insert is made of a second material that is softer than the first material.

A further non-limiting embodiment of the foregoing method includes securing the insert to the frame by molding the insert on to the frame.

In a further non-limiting embodiment of any of the foregoing methods, the first material has a higher durometer than the second material.

In a further non-limiting embodiment of any of the foregoing methods, the first material includes nylon, and the second material is a polyurethane foam.

In a further non-limiting embodiment of any of the foregoing methods, the frame and insert are portions of a traction battery pack of an electrified vehicle.

A further non-limiting embodiment of any of the foregoing methods includes powering a drive wheel of an electrified vehicle with the battery cell.

In a further non-limiting embodiment of any of the foregoing methods, the battery cell is disposed along an axis of a battery array, and the compressing is in a radial direction relative to the axis.

In a further non-limiting embodiment of any of the foregoing methods, the battery cell is a pouch cell.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure relates to a support assembly for holding a battery cell within a battery array. The support assembly includes a frame providing an aperture to receive the battery cell. In at least some areas, an insert is positioned between the frame and the battery cell.

The insert is compressible relative to the frame and the battery cell. Accordingly, the insert can conform to geometries of the frame and the battery cell, and can maintain contact with the frame and the battery cells even if their surfaces include irregularities. The insert can also reduce vibratory loads introduced to the battery cell through the frame.

Figure 1:
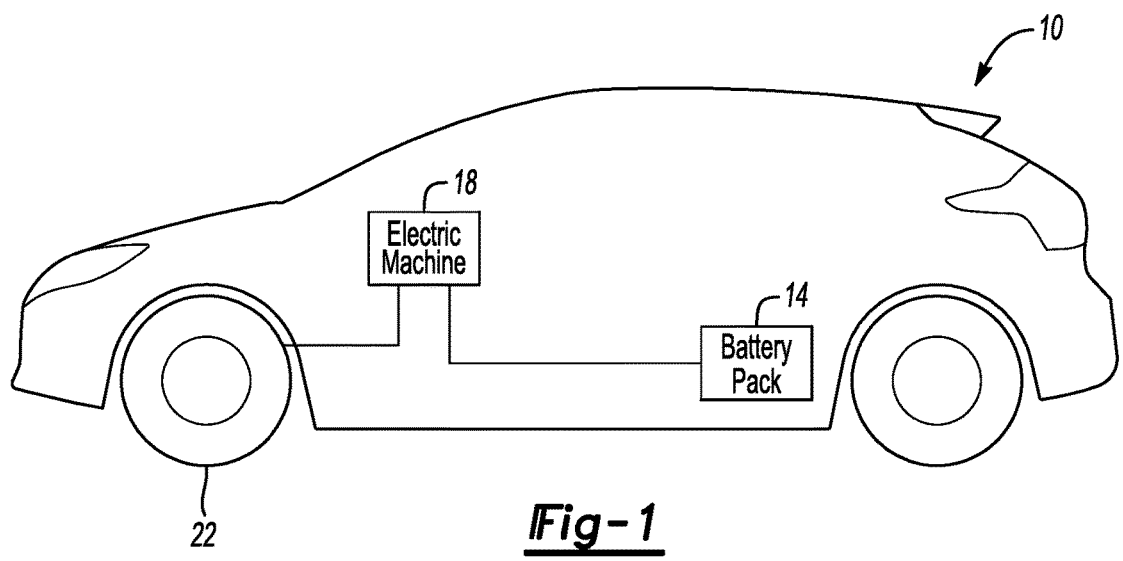
FIG. 1 illustrates a highly schematic view of an electrified vehicle.

Referring to FIG. 1, an example electrified vehicle 10 includes a battery pack 14, an electric machine 18 and a pair of wheels 22. The electric machine 18 can receive electric power from the battery pack 14. The electric machine 18 converts the electric power to torque that drives the wheels 22. The battery pack 14 can be considered relatively a high voltage traction battery pack.

The example electrified vehicle 10 is an all-electric vehicle. In other examples, the electrified vehicle 10 is a hybrid electric vehicle, which can selectively drive the wheels 22 with torque provided by an internal combustion engine instead of, or in addition to, the electric machine.

Figure 2:
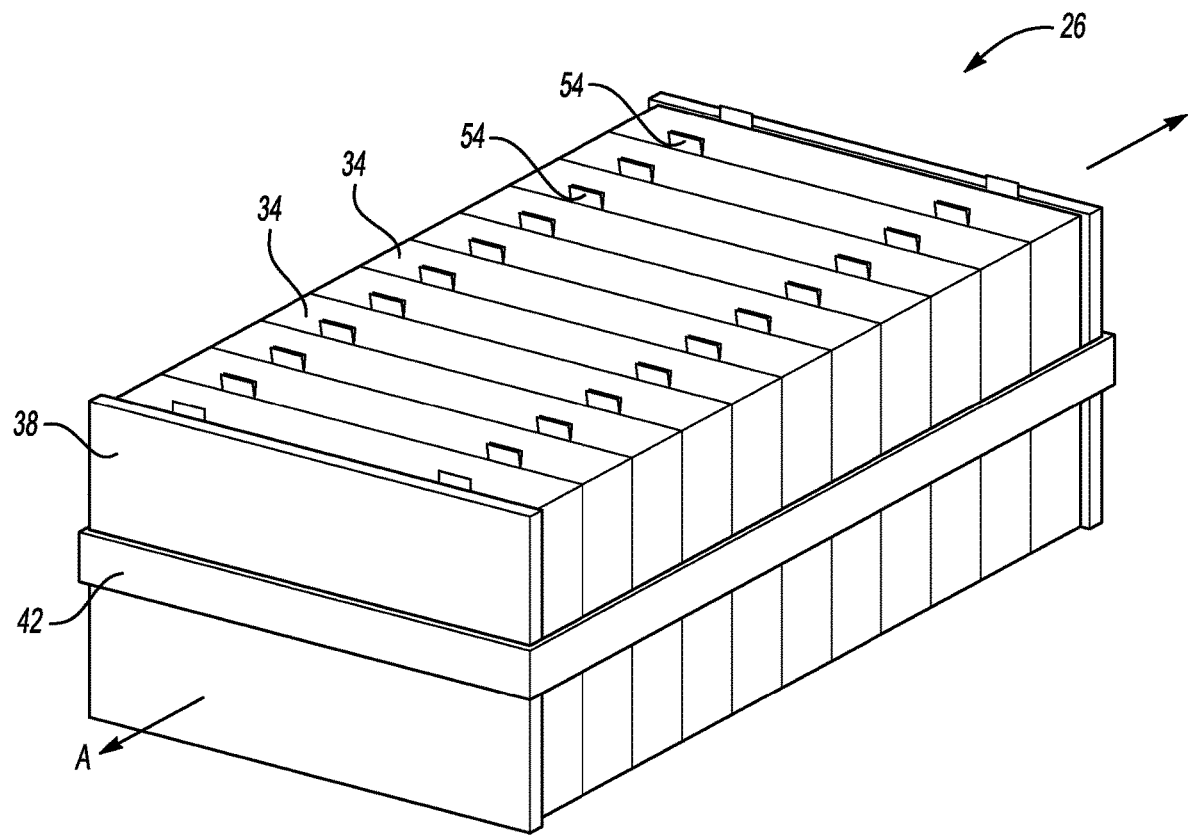
FIG. 2 illustrates a perspective view of an example battery array from a battery pack in the electrified vehicle of FIG. 1.
Figure 3:
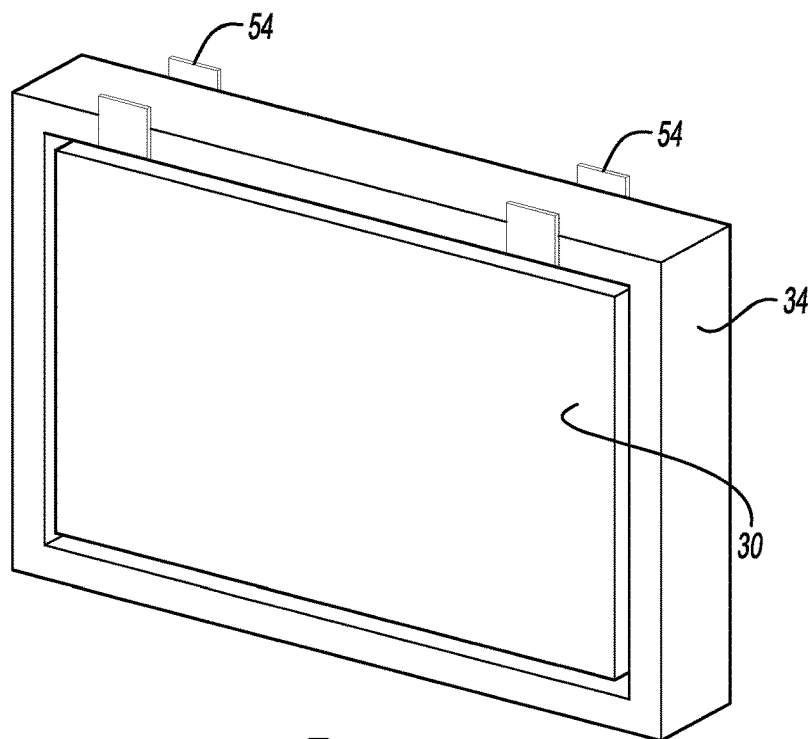
FIG. 3 illustrates a perspective view of a support assembly from the battery array of FIG. 2 holding battery cells.
Figure 4:
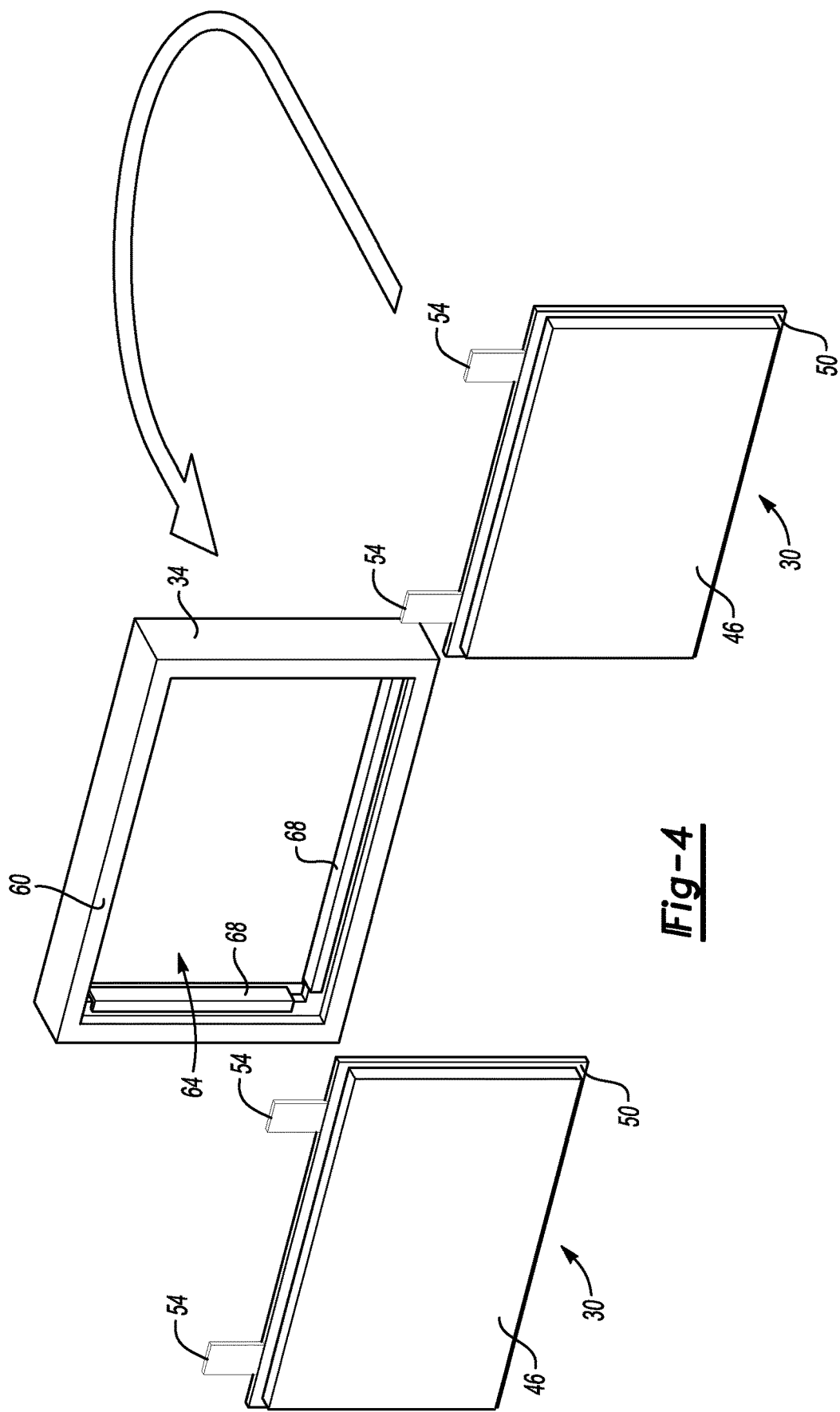
FIG. 4 illustrates a perspective exploded view of the support assembly and two battery cells from the battery array of FIG. 2.

Referring now to FIGS. 2 to 4 with continuing reference to FIG. 1, the battery pack 14 includes an array 26. The battery pack 14 can include more than one array 26 in some examples.

In this exemplary embodiment, the array 26 includes a plurality of battery cells 30 and support assemblies 34 disposed along an axis A. The array 26 includes twenty-two battery cells 30 and eleven support assemblies 34, but other numbers of battery cells 30 and support assemblies could be used.

Each of the example support assemblies 34 holds two battery cells 30. In other examples, the support assemblies 34 could hold one battery cell 30, or more than two battery cells 30.

The battery cells 30 have an axial width of about 5.46 millimeters in this example. The support assemblies 34 have an axial width that is about twice the axial width of the battery cells 30.

Within the array 26, the support assemblies 34 and battery cells 30 are compressed axially between end plates 38. A band 42 is disposed about the array 26 to apply compression along the axis A to the frames 60 and the battery cells 30 of the array 26. The end plates 38 can be a metallic material.

In this embodiment, the battery cells 30 are lithium-ion pouch cells. The battery cells 30 include an active area 46 and a flange 50 extending radially from the active area 46. Terminals 54 also extend from the active area 46 and the flange 50. The battery cells 30 have an outer covering, or sheet, that is made of aluminum in this example. The covering is sealed at a perimeter of the battery cells 30 to close off the active areas 46. The flange 50 represents the sealed areas of the aluminum sheet.

Other embodiments could use other types of battery cells 30 that are used in connection with a frame, such as cylindrical cells or prismatic cells.

The example support assembly 34 includes a frame 60 providing an aperture 64 that receives the battery cells 30. The frame 60 resembles a picture frame. The aperture 64 is rectangular and is sized to accommodate the battery cells 30.

When the support assembly 34 is holding the battery cells 30 within the array 26, the active area 46 and at least some areas of the flange 50 are positioned within the aperture 64. The terminals 54 extend outside the aperture 64 and past the support assemblies 34. The terminals 54 electrically connect the battery cells 30 with another structure, such as a bus bar, for example.

Power from the battery cells 30 moves to and from the terminals 54 through the bus bar. The power from the battery cells 30 can power the drive wheels 22. The electric machine 18 can recharge the battery cells 30 through the terminals 54.

The battery cells 30 of the array 26 can vary dimensionally. For example, the active area 46 of one of the battery cells 30 in the array 26 may be slightly larger than the active area 46 of another one of the battery cells 30 in the array 26. Each individual battery cell 30 could also have some dimensional variations. For example, a given one of the battery cells 30 could be have an axially thickness that is increased at the bottom of the battery cell 30 relative to an axial thickness at the top of the battery cell 30.

Dimensions of the frames 60 can also vary. For example, the aperture 64 of one of the frames 60 in the array 26 could be slightly oversized relative to the aperture 64 of another one of the frames 60.

Manufacturing tolerances, build tolerances, environmental factors, etc., can cause such variations in the frames 60 and battery cells 30. As can be appreciated, the variations can lead to inconsistent interfaces between the frame 60 and the battery cells 30. The example support assembly 34 helps to accommodate these variations by incorporating an insert 68 that is softer than the frame 60 and, potentially, the battery cells 30.

Figure 5:
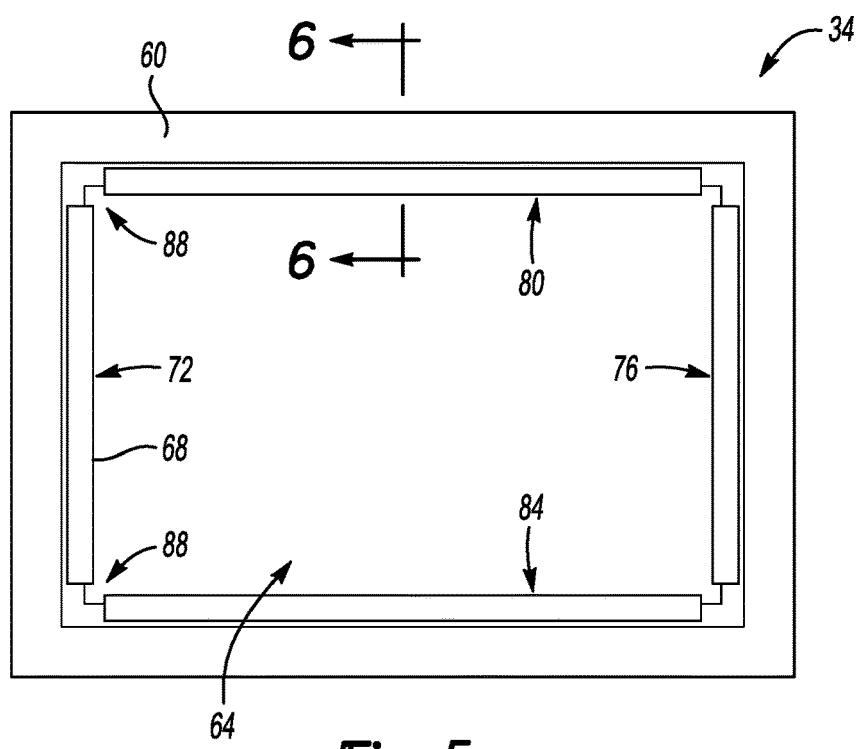
FIG. 5 illustrates a front view of the support assembly of FIG. 4.

Referring now to FIG. 5 with continuing reference to FIGS. 3 and 4, the insert 68, or liner, is secured to the frame 60 about a perimeter of the aperture 64. When the battery cells 30 are positioned within the aperture 64, the insert 68 interfaces with the battery cells 30. The perimeter is, for purposes of this disclosure, the radially outermost portion of the aperture 64 at a given axial location.

The frame 60 is made of a relatively rigid material such as a nylon-based polymer having a Shore D durometer value higher than 50. Rigid plastics that are not nylon-based could be used in place of the nylon-based polymer.

The insert 68 is made of a material that is softer than the material of the frame 60, such as a polyurethane foam having a Shore OO durometer value of less than 50. Other types of softer materials could be used for the insert, such as foams other than polyurethane foam.

A durometer value of the frame 60 is higher than the durometer of the insert 68, which is why the insert 68 can be considered softer than the frame 60. The foam of the insert 68 could include an outer skin of a different material. Materials for the frame 60 and the insert 68 can be selected to have other durometers based on a specific program target. Even if the durometers are changed, the frame 60 can remain rigid relative to the insert 68, and the insert 68 can meet compression targets.

The softness of the insert 68 can help to cushion the battery cells 30. That is, the insert 68 can help to absorb impact and shock loads.

In some exemplary embodiments, the insert 68 is compressible relative to the frame 60 and the battery cells 30. Placing the battery cells 30 within the aperture 64 can compress the insert 68, which enables the insert 68 to conform to irregularities at the interface between the frame 60 and the battery cells 30. In a specific exemplary embodiment, the battery cells 30 are radially oversized relative to the insert 68. As the battery cells 30 are moved into the aperture 64, the oversizing causes the battery cells 30 to compress the insert 68. The battery cells 30 are thus press-fit into the aperture 64.

An amount that the insert 68 is compressed can vary depending on a spacing between the frame 60 and the battery cell 30 positioned within the aperture 64. For example, the insert 68 is more compressed in areas where the frame 60 is closer to the battery cell 30, and less compressed in areas where the frame 60 is further from the battery cell 30. The compressibility and softness of the insert 68 permits the support assembly 34 to maintain robust contact with the battery cell 30 even if there are variations in the spacing between the frame 60 and the battery cell 30. Spacing between the support assembly 34 and the battery cells 30 could undesirably accelerate fatigue due to vibrations, for example.

In this exemplary embodiment, the insert 68 includes four separate sections. A section is secured to opposing lateral sides 72 and 76 of the frame 60 about the aperture 64. A section of the insert 68 is further secured to a top 80 of the frame 60, and the remaining section of the insert is secured to a bottom 84 of the frame 60.

Notably, in this example embodiment, the frame 60 includes corners 88 that define part of the perimeter of the aperture, but do not include the insert 68. This provides some relief in the corners 88, which can, among other things, facilitate positioning the battery cells 30 within the aperture 64.

Figure 6:
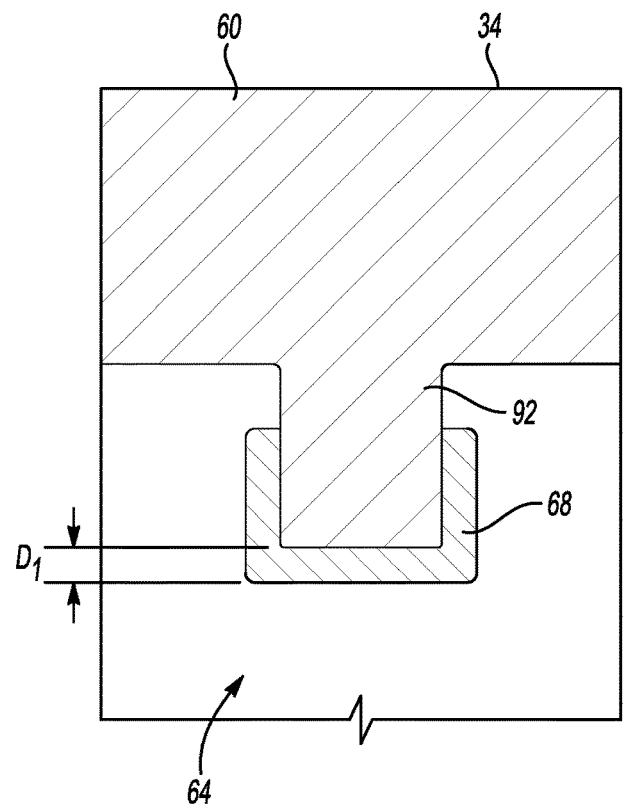
FIG. 6 illustrates a section view at Line 6-6 in FIG. 5.
Figure 7:
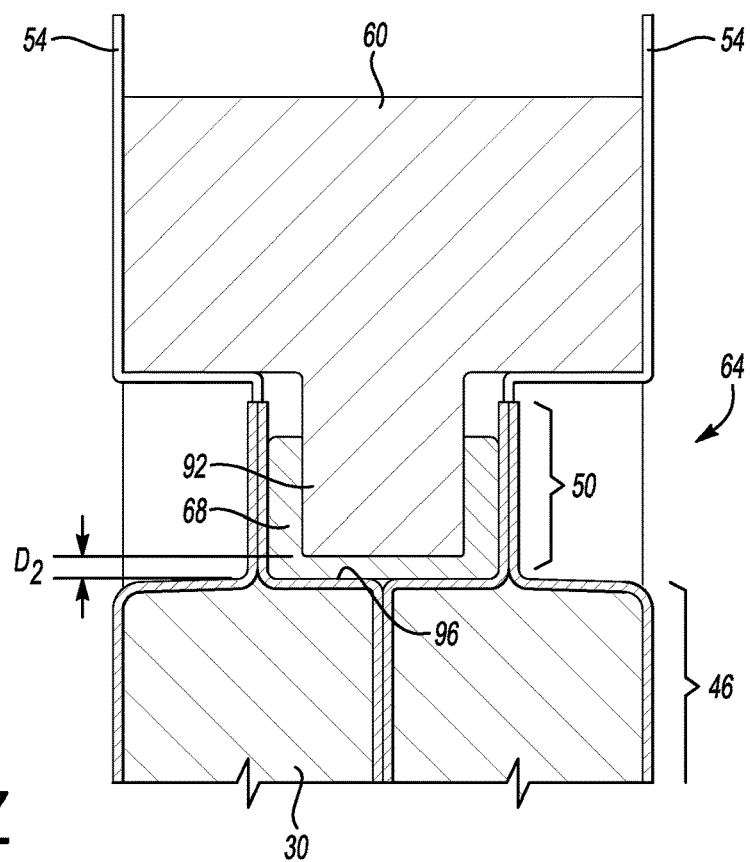
FIG. 7 illustrates a section view taken at the position of FIG. 6 when the support assembly of FIG. 5 is holding two battery cells.

Referring now to FIGS. 6 and 7, with continuing reference to FIGS. 3 to 5, the example frame 60 includes a frame flange 92 extending about a perimeter of the aperture 64. The frame flange 92 is a locating feature that facilitates positioning battery cells 30 within the aperture 64. That is, when the battery cell 30 is moved axially into the aperture 64, the frame flange 92 stops the battery cell 30 from moving all the way through the aperture 64.

The example insert 68 is secured directly to the frame flange 92 in this non-limiting embodiment. In another embodiment, the insert 68 could be secured to another area of the frame 60.

Portions of the insert 68 face toward the axis A (FIG. 2) such that the insert 68 directly contacts a surface of the battery cell 30 that faces away from the axis A when the battery cell 30 is positioned within the aperture 64.

Prior to installing the battery cells 30 within the aperture 64, the insert 68 extends a distance $D_1$ from the frame flange 92 as shown in FIG. 6. When the battery cells 30 are positioned within the aperture 64 in an installed position, the insert 68 is compressed radially between a shoulder 96 of the battery cells 30 and the frame flange 92 of the frame 60.

When compressed, the insert 68 extends a distance $D_2$ from the frame flange 92 as shown in FIG. 7. The distance $D_2$ is less than the distance $D_1$. The movement of the battery cells 30 to the installed position thus compresses the insert 68. The support assembly 34, with the insert 68, closely hugs the battery cells 30 and accommodates geometric variations and inconsistencies in frame 60 and the battery cell 30, such as in the transitions between the active area 46, shoulder 96, and flange 50.

The example insert 68 is molded onto the frame flange 92. That is, the insert 68 is secured to the frame 60 during a molding process. For example, the frame 60 could be injection molded. After the frame 60 has cured, the frame 60 is placed adjacent to a mold cavity for forming the insert 68. Material of the insert 68 is then moved into the mold cavity. The insert 68 cures in the cavity about a desired area of the frame 60, which is the frame flange 97 in this example. Once the insert 68 cures, the insert 68 is secured to the frame flange 92.

Figure 8:
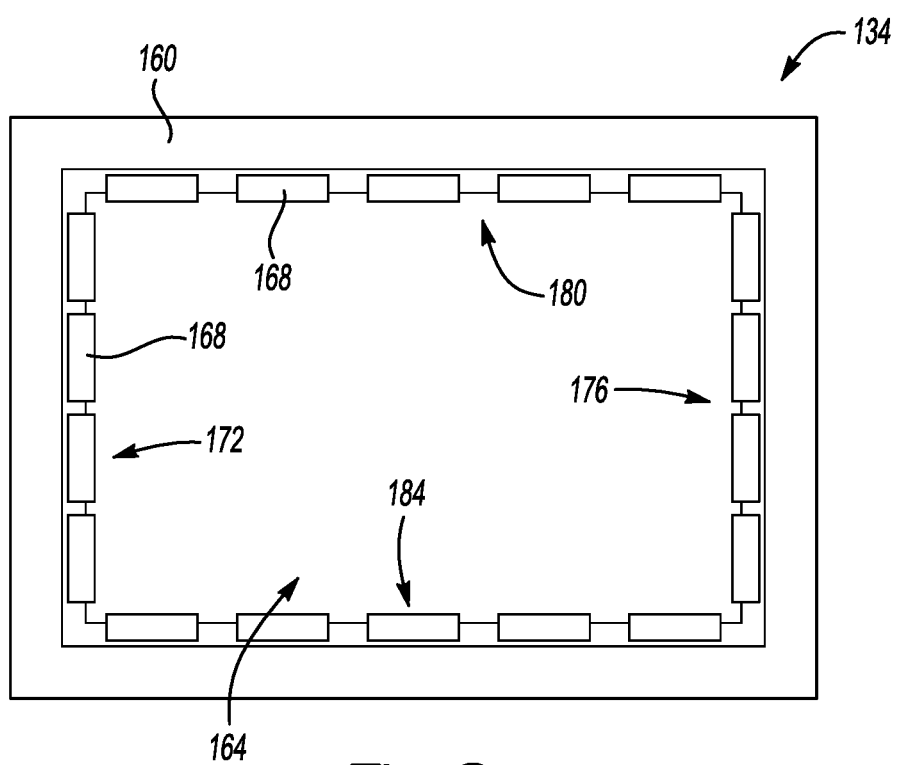
FIG. 8 illustrates a front view of a support assembly according to another exemplary embodiment.

Referring now to FIG. 8, a support assembly 134 according to another exemplary embodiment includes an insert 168 secured to a frame 160 about a perimeter of an aperture 164. When battery cells are positioned within the aperture 164, the insert 168 interfaces with the battery cells.

The insert 168 includes a plurality of separate sections secured to a lateral side 172 of the frame 160, and a plurality of separate sections secured to an opposing lateral side 176 of the frame 160. The insert 168 further includes a plurality of separate sections secured to a top 180 of the frame 160, and a plurality of separate sections secured to a bottom 184 of the frame 160.

Features of some of the disclosed embodiments can include robustly retaining battery cells within frames by using an insert that conforms to non-uniform geometries at interfaces between the battery cells and the frames and battery cells. Another feature can include using the insert to cushion the battery cells, which can facilitate meeting vibration and impact/shock requirements by reduce impact loads and shocks to the battery cells. Another feature can include molding the inserts on to the frames so that manufacturing complexity is reduced. That is, the softer material of the insert is molded on to the harder material of the frame.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. A support assembly for a battery array, comprising:
   a frame; and
   an insert secured to the frame, the insert configured to hold at least one battery cell within the frame, the frame made of a first material and the insert made of a second material, the first material having a durometer value that is higher than a durometer value of the second material, the insert outside the least one battery cell.

2. The support assembly of claim 1, wherein the frame includes an aperture configured to receive the at least one battery cell, the insert disposed about a perimeter of the aperture.

3. The support assembly of claim 2, further comprising the at least one battery cell, wherein the at least one battery cell is press-fit axially into the aperture such that the at least one battery cell compresses the insert radially between a shoulder of the at least one battery cell and a flange frame of the frame.

4. The support assembly of claim 2, further comprising the at least one battery cell, wherein the at least one battery cell is a pouch cell having an active area and a flange extending radially from the active area, the flange a sealed area of an outer covering of the at least one battery cell, the insert configured to compress against the outer covering.

5. The support assembly of claim 2, further comprising the at least one battery cell, wherein the at least one battery cell includes a first battery cell having a portion positioned within the aperture, and a second battery cell having a portion positioned within the aperture, the first and second battery cells compressed together along an axis, the perimeter of the aperture circumferentially distributed about the axis.

6. The support assembly of claim 2, wherein the aperture has a rectangular perimeter, and the insert includes a portion disposed on a first lateral side, an opposing, second lateral side, a top side, and a bottom side of the rectangular perimeter.

7. The support assembly of claim 2, wherein the perimeter includes a plurality of corners without the insert to provide relief areas for the at least one battery cell.

8. The support assembly of claim 1, wherein the frame is disposed about an axis, and the insert is configured face toward the axis such that the insert directly contacts a surface of the at least one battery cell facing away from the axis.

9. The support assembly of claim 1, wherein the first material comprises nylon, and the second material is a polyurethane foam.

10. The support assembly of claim 1, wherein the frame and insert are portions of a traction battery pack of an electrified vehicle.

11. An electrified vehicle battery array comprising the support assembly of claim 1 as a first support assembly and further comprising:
a plurality of second support assemblies disposed along an axis with first support assembly, the first frame and second support assemblies compressed along the axis.

12. A method of securing a battery cell within a traction battery pack of an electrified vehicle, comprising:
compressing an insert against at least one battery cell, the insert secured to a frame made of a first material, the insert made of a second material, the first material having a higher durometer value than the second material, the insert outside the at least one battery cell.

13. The method of claim 12, comprising securing the insert to the frame by molding the insert on to the frame.

14. The method of claim 12, wherein the first material comprises nylon, and the second material is a polyurethane foam.

15. The method of claim 12, wherein the frame and insert are portions of a traction battery pack of an electrified vehicle.

16. The method of claim 12, further comprising powering at least one drive wheel of an electrified vehicle with the at least one battery cell.

17. The method of claim 12, wherein the at least one battery cell is disposed along an axis of a battery array, and the compressing is in a radial direction relative to the axis, wherein the frame includes an aperture configured to receive the at least one battery cell, wherein a perimeter of the aperture extends circumferentially continuously about the axis, wherein the insert is disposed about a perimeter of the aperture.

18. The method of claim 12, wherein the at least one battery cell is a pouch cell.

19. A support assembly for a battery array, comprising:
a frame made of a first material having a first durometer value; and
an insert made of a second material having a second durometer value that is less than the first durometer value, the insert secured directly to a frame flange of the frame and configured to hold at least one battery cell.

* * * * *

UNITED STATES PATENT AND TRADEMARK OFFICE
CERTIFICATE OF CORRECTION

PATENT NO. : 10,566,588 B2
APPLICATION NO. : 15/271314
DATED : February 18, 2020
INVENTOR(S) : Rajaram Subramanian et al.

It is certified that error appears in the above-identified patent and that said Letters Patent is hereby corrected as shown below:

In the Claims

In Claim 1, Column 6, Line 41; replace "the least one battery cell." with --the at least one battery cell.--

In Claim 3, Column 6, Line 50; replace "flange frame" with --frame flange--

Signed and Sealed this
First Day of March, 2022

Drew Hirshfeld
*Performing the Functions and Duties of the*
*Under Secretary of Commerce for Intellectual Property and*
*Director of the United States Patent and Trademark Office*